Patented Nov. 17, 1931

1,832,163

UNITED STATES PATENT OFFICE

GEORGE STAFFORD WHITBY, OF MONTREAL, QUEBEC, CANADA, ASSIGNOR, BY MESNE ASSIGNMENTS, TO THE ROESSLER & HASSLACHER CHEMICAL COMPANY, OF NEW YORK, N. Y., A CORPORATION OF DELAWARE

ACCELERATOR FOR THE VULCANIZATION OF RUBBER

No Drawing. Application filed October 22, 1927, Serial No. 228,101. Renewed February 24, 1931.

This invention relates to vulcanizing rubber or similar materials, and to the products obtained thereby being more particularly directed to acceleration of vulcanization by an organic accelerator and to the products resulting from such vulcanization.

The object of this invention is to produce an accelerator of the vulcanization of rubber which will, when properly compounded, produce finished rubber articles of superior physical properties such as high stress strain relationship, increased tensile strength, and freedom from sulphuring out or blooming. Further it is desired to provide high powered accelerators at lower costs than are now prevalent.

An acceptable accelerator of rubber vulcanization should have several characteristics. It should be of low cost; it should be complete in itself, i. e. require no additional agents or "activators"; it should be applicable to stocks utilizing various rubber substitutes, antioxidants, conditioners, etc. utilized by rubber compounders; furthermore, it should have suitable physical characteristics, it should preferably be a solid having a melting point below the vulcanization temperature at which it is to be used, but sufficiently high so that the accelerator will not fuse or lump together at ordinary temperatures, it should be practically odorless; it should give off no fumes having an irritating action on the eyes, nose, and throat or deleterious to the health of the operators.

The accelerator of my invention fulfills these conditions. My accelerator belongs to a general class of substances which I call carbalkoxythione disulphides and which are represented by the general formula

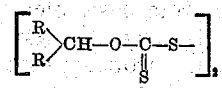

My accelerator is the isopropyl derivative, carbisopropoxy thione disulphide and has the formula:

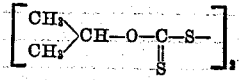

It is to be seen from the above formula that this compound is a $CS_2$ derivative of a secondary alcohol, namely, isopropyl alcohol, two of the simple $CS_2$ derivatives of the alcohol being condensed to give my accelerator.

I am aware that it has been previously proposed to utilize disulphides similar in structure to the above which, however, are derivatives of primary alcohols. I have found that my derivative from the isopropyl alcohol forms a superior accelerator. It is complete in itself and requires no activators, such as amines, to secure very high tensiles in the finished rubber. It can be used in conjunction with the ordinary rubber conditioning agents, antioxidants, rubber substitutes, reclaims, etc. or in combination with other accelerators if desired. None of these are necessary, however, as will be seen from the examples given below. I have found that the corresponding derivatives of the primary alcohols do not give satisfactory results unless an amine activator is utilized. Furthermore, my accelerator is a solid having satisfactory melting point from the standpoint of packing, storage, and use in the rubber; the accelerator, being solid, can be obtained in high purity; this is impossible with the normally liquid or extremely low melting derivatives. The liquid derivatives very easily retain low melting or gaseous impurities which, unless removed, impart a disagreeable odor to the accelerator or give off irritating fumes when incorporated with the rubber on the mill. Furthermore, since my accelerator is a solid the preparation and isolation is simple. It is prepared by oxidation of sodium isopropyl xanthate. For this oxidation I prefer to utilize NaOCl in a process as described by G. C. Bailey in his copending application S. N. 175,633, filed March 15, 1927. If chlorine is used in the oxidation considerable impurities are formed and the product is usually liquid. Furthermore, especially valuable stress-strain relationships and general adaptability are found with this accelerator, which do not occur with the primary alcohol derivatives as seen from the examples given below.

This isopropyl compound when utilized as the accelerator in rubber vulcanization by incorporating it with unvulcanized rubber or the like, and in the presence of a vulcanizing agent gave results as follows:

EXAMPLE I

*Thread stock*

| | Parts by weight |
|---|---|
| Smoked sheet | 53 |
| Reclaim | 10 |
| Zinc oxide | 5 |
| Carbon black | 20 |
| M. R. X. | 3 |
| Sulphur | 3 |
| Tar oil | 2 |
| Carbisopropoxy thione disulphide | 1 |

The above ingredients were thoroughly mixed on the rubber mill and then cured at the temperature of 40 lbs. steam for 60 minutes. A test piece from this rubber gave a stretch of 710%; a load at 600% elongation of 3000 lbs./in.$^2$ and a tensile strength at break of 3769 lbs./in.$^2$; average hardness 60 with a Shore durometer.

EXAMPLE II

*Highly compounded stock*

| | |
|---|---|
| Brown crepe | 9.0 |
| Smoked sheet | 91.0 |
| Reclaim | 10.0 |
| Sulphur | 3.8 |
| Zinc oxide | 14.0 |
| Carbon black | 30.0 |
| M. R. X. | 5.0 |
| Hard wood pitch | 1.0 |
| Carbisopropoxy thione disulphide | 2.5 |
| Low melting formaldehyde aniline | 0.5 |

The above stock was cured at a temperature of 20 lbs. steam and the results as given below were obtained:

*20 lbs. pressure*

| Time of cure | Stretch | Load at 500% Elong. | Tensile | Hardness |
|---|---|---|---|---|
| 30 | 740 | 2800 | 5456 | 60 |
| 45 | 720 | 2400 | 5526 | 60 |
| 60 | 720 | 2600 | 5296 | 60 |

My accelerator has another distinct advantage in that it has a sharp critical time and temperature. For this reason up to a very definite temperature no prevulcanization or setting up will occur and when vulcanization is started the cure is quickly "set off" and the rubber reaches its maximum tensile in a short period of time, and then has a flat tensile-temperature curve. This is shown by the following example.

EXAMPLE III

*Critical temperature test*

*Standard low zinc stock*

| | |
|---|---|
| Smoked sheet | 100 |
| Zinc oxide | 5 |
| Sulphur | 5 |
| Carbisopropoxy thione disulphide | 1 |

Time of cure 1 hour.

| Temp. °C. | Stretch | Set | 600% Elong. | Tensile |
|---|---|---|---|---|
| 100 | No vulcanization. | | | |
| 105 | 790 | 10 | 600 | 2519 |
| 110 | 801 | 15 | 1550 | 4638 |
| 115 | 841 | 10 | 1180 | 4627 |
| 121 | 860 | 15 | 900 | 3986 |
| 141 | 930 | 15 | 500 | 2415 |

*Critical time test*

The stock of this example was now cured at a temperature of 115° C. for varying periods and results obtained as given below.

| Cure | Stretch | Set | 600% Elong. | Tensile |
|---|---|---|---|---|
| 25 | Practically no vulcanization. | | | |
| 28 | Vulcanization just commenced—too weak to test. | | | |
| 30 | 821 | 15 | 1200 | 5105 |
| 40 | 802 | 20 | 1200 | 4660 |
| 50 | 822 | 15 | 1200 | 4880 |
| 60 | 821 | 20 | 1150 | 4615 |
| 75 | 810 | 20 | 1250 | 4490 |

From Example III, it is seen that at 100° C. no vulcanization was obtained in 1 hour; at 105° C. fair vulcanization was obtained, and at 110° C. the maximum had been reached. Raising the temperature beyond this point was somewhat detrimental to the action of the accelerator although it could be safely used up to 120° C.

The optimum cure is seen to have occurred in 30 minutes at 115° C., or a temperature corresponding to that of steam at 10 pounds pressure. Beyond 30 minutes through 75 minutes the tensile fell off only very gradually. An interesting feature of the test of Example III is the constancy of the load at 600% elongation.

Claims:

1. Process of treating rubber or similar material which comprises incorporating with unvulcanized rubber or the like a vulcanizing agent and carbisopropoxy thione disulphide and subjecting the mixture to a vulcanizing temperature.

2. Process of accelerating the vulcanization of rubber which comprises vulcanizing the same in the presence of the oxidation product of the $CS_2$ derivative of isopropyl alcohol.

3. A vulcanized rubber derived from rubber or similar material incorporated with a vulcanizing agent and carbisopropoxy thione disulphide.

Signed at Perth Amboy, in the county of Middlesex and State of New Jersey this 14th day of October A. D. 1927.

GEORGE STAFFORD WHITBY.